(12) United States Patent
Matsuoka

(10) Patent No.: US 10,468,921 B2
(45) Date of Patent: Nov. 5, 2019

(54) PERMANENT MAGNET SYNCHRONOUS MOTOR

(71) Applicant: Mitsubishi Electric Corporation, Tokyo (JP)

(72) Inventor: Atsushi Matsuoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 178 days.

(21) Appl. No.: 15/554,835

(22) PCT Filed: Jun. 17, 2015

(86) PCT No.: PCT/JP2015/067470
§ 371 (c)(1),
(2) Date: Aug. 31, 2017

(87) PCT Pub. No.: WO2016/203578
PCT Pub. Date: Dec. 22, 2016

(65) Prior Publication Data
US 2018/0041076 A1    Feb. 8, 2018

(51) Int. Cl.
*H02K 1/14*  (2006.01)
*H02K 21/16* (2006.01)
*H02K 21/02* (2006.01)

(52) U.S. Cl.
CPC ............ *H02K 1/146* (2013.01); *H02K 1/14* (2013.01); *H02K 21/02* (2013.01); *H02K 21/16* (2013.01); *H02K 2213/03* (2013.01)

(58) Field of Classification Search
CPC .......... H02K 1/146; H02K 1/14; H02K 21/02; H02K 21/16; H02K 2213/03
See application file for complete search history.

(56) References Cited

U.S. PATENT DOCUMENTS 6,495,941 B1   12/2002   Nishimura
7,141,905 B2   11/2006   Vollmer
(Continued)

FOREIGN PATENT DOCUMENTS

CN   100594656 C   3/2010
CN   103858327 A   6/2014
(Continued)

OTHER PUBLICATIONS

Ishak et al, "Permanent Magnet Brushless Machines with Unequal Tooth Widths and Similar Slot and Pole Numbers", IEEE Transactions on Industry Applications, vol. 41, No. 2, Mar./Apr. 2005, pp. 584-590.*

(Continued)

*Primary Examiner* — Emily P Pham
(74) *Attorney, Agent, or Firm* — Posz Law Group, PLC

(57) ABSTRACT

A 10-pole 12-slot permanent magnet synchronous motor comprises a plurality of teeth. From among two adjacent teeth around which coils of the same phase are wound adjacent to each other, the rotational direction width of a winding portion of a first tooth placed in front along a rotational direction of a rotor is set narrower than that of a winding portion of a second tooth placed behind along the rotational direction of the rotor. With this configuration, the circumferential length of the coil wound around the first tooth can be shortened with suppressing increase in iron loss in the winding portion of the first tooth.

5 Claims, 4 Drawing Sheets

(56) References Cited

U.S. PATENT DOCUMENTS

| | | | |
|---|---|---|---|
| 9,564,779 B2 | 2/2017 | Nakano et al. | |
| 2005/0231060 A1 | 10/2005 | Vollmer | |
| 2008/0290751 A1 | 11/2008 | Hwang et al. | |
| 2013/0076195 A1* | 3/2013 | Li | H02K 21/16 310/216.097 |
| 2014/0145547 A1 | 5/2014 | Nakano et al. | |
| 2015/0001975 A1* | 1/2015 | Nakazono | H02K 1/06 310/152 |
| 2016/0172949 A1 | 6/2016 | Matsuoka et al. | |
| 2018/0062460 A1* | 3/2018 | Baba | H02K 21/16 |

FOREIGN PATENT DOCUMENTS

| | | |
|---|---|---|
| CN | 204179905 U | 2/2015 |
| JP | 2001-186733 A | 7/2001 |
| JP | 2001-245460 A | 9/2001 |
| JP | 2001-327135 A | 11/2001 |
| JP | 2003-088011 A | 3/2003 |
| JP | 2004-304928 A | 10/2004 |
| JP | 2006-311738 A | 11/2006 |
| JP | 2006-325386 A | 11/2006 |
| JP | 2013-128378 A | 6/2013 |
| JP | 2013-132149 A | 7/2013 |
| WO | 2015/029256 A1 | 3/2015 |

OTHER PUBLICATIONS

Office action dated Dec. 19, 2018 in the corresponding CN patent application No. 201580079286.X (and English machine translation thereof).

International Search Report of the International Searching Authority dated Aug. 25, 2015 for the corresponding international application No. PCT/JP2015/067470 (and English translation).

Office Action dated Jul. 11, 2019 issued in corresponding CN patent application No. 201580079286.X (and partial English translation).

* cited by examiner

PERMANENT MAGNET SYNCHRONOUS MOTOR

CROSS REFERENCE TO RELATED APPLICATION

This application is a U.S. national stage application of International Patent Application No. PCT/JP2015/067470 filed on Jun. 17, 2015, the disclosure of which is incorporated herein by reference.

TECHNICAL FIELD

The present invention relates to a stator core and a permanent magnet synchronous motor that rotate a rotor using magnetic fields generated by permanent magnets provided on the rotor and magnetic fields generated by currents flowing through coils wound on a stator and to an air-conditioning apparatus.

BACKGROUND

In the conventional synchronous motor described in Patent Literature 1, a plurality of teeth having toroidal windings wound are provided at unequal pitches in a stator in order to facilitate assembly work, the shapes of the teeth being alternately different, and holes for fixing are provided in teeth larger in width along a rotational direction from among the plurality of teeth. In the conventional synchronous motor described in Patent Literature 2, there are 8 poles and 12 slots for the relationship between the number of magnetic poles and the number of slots, and teeth different in width are alternately arranged in a rotational direction on an annular core back. In the conventional synchronous motor described in Patent Literature 3, in order to reduce torque ripples and cogging torque, a stator is used in which, from among a plurality of teeth, the shape of the teeth forming phase 1 or phase 2 is different from those of the teeth forming the other phases.

PATENT LITERATURE

Patent Literature 1: Japanese Patent Application Laid-open Publication No. 2006-325386
Patent Literature 2: Japanese Patent Application Laid-open Publication No. 2001-327135
Patent Literature 3: Japanese Patent Application Laid-open Publication No. 2006-311738

In a 10-pole 12-slot permanent magnet synchronous motor having coils wound in concentrated winding, four coils forming one phase are divided into two sets, and two coils forming each of the sets are wound around the winding portions of two adjacent teeth respectively. In the permanent magnet synchronous motor configured in this way, with respect to the rotational direction of a rotor, from among the two adjacent teeth forming part of one phase, an iron loss occurring in the tooth located in front along the rotor rotational direction is smaller than an iron loss occurring in the tooth located behind along the rotor rotational direction. That is, the respective iron losses of the two adjacent teeth forming part of the same phase are not even. As such, in the 10-pole 12-slot permanent magnet synchronous motor, the respective iron losses occurring in a set of the adjacent teeth forming part of one phase are different. However, the conventional techniques described in Patent Literatures 1 to 3 do not aim to further improve motor efficiency focusing on the iron losses and shapes of the teeth.

SUMMARY

The present invention was made in view of the above, and an object thereof is to provide a stator core, a permanent magnet synchronous motor, and an air-conditioning apparatus that further improve the motor efficiency.

To solve the above problem and achieve the object, a 10N-pole 12 N-slot stator core according to the present invention includes an annular yoke and a plurality of teeth arranged inward of the yoke apart in a circumferential direction of the yoke. Each of the plurality of teeth has a portion around which a coil is wound; the plurality of teeth make up 6N number of teeth groups; coils of the same phase are wound around each of the 6N number of teeth groups; each of the 6N number of teeth groups includes a first tooth and a second tooth of the teeth group sequentially arranged in a rotational direction of the rotor; and a width of the portion of the first tooth is narrower than a width of the portion of the second tooth and N is an integer of one or greater.

Advantageous Effects of Invention

The stator core according to the present invention produces the effect of being able to further improve the motor efficiency.

DETAILED DESCRIPTION

Permanent stator core according to embodiments of the present invention will be described in detail below with reference to the drawings. Note that these embodiments are not intended to limit the present invention.

First Embodiment

Figure 1:
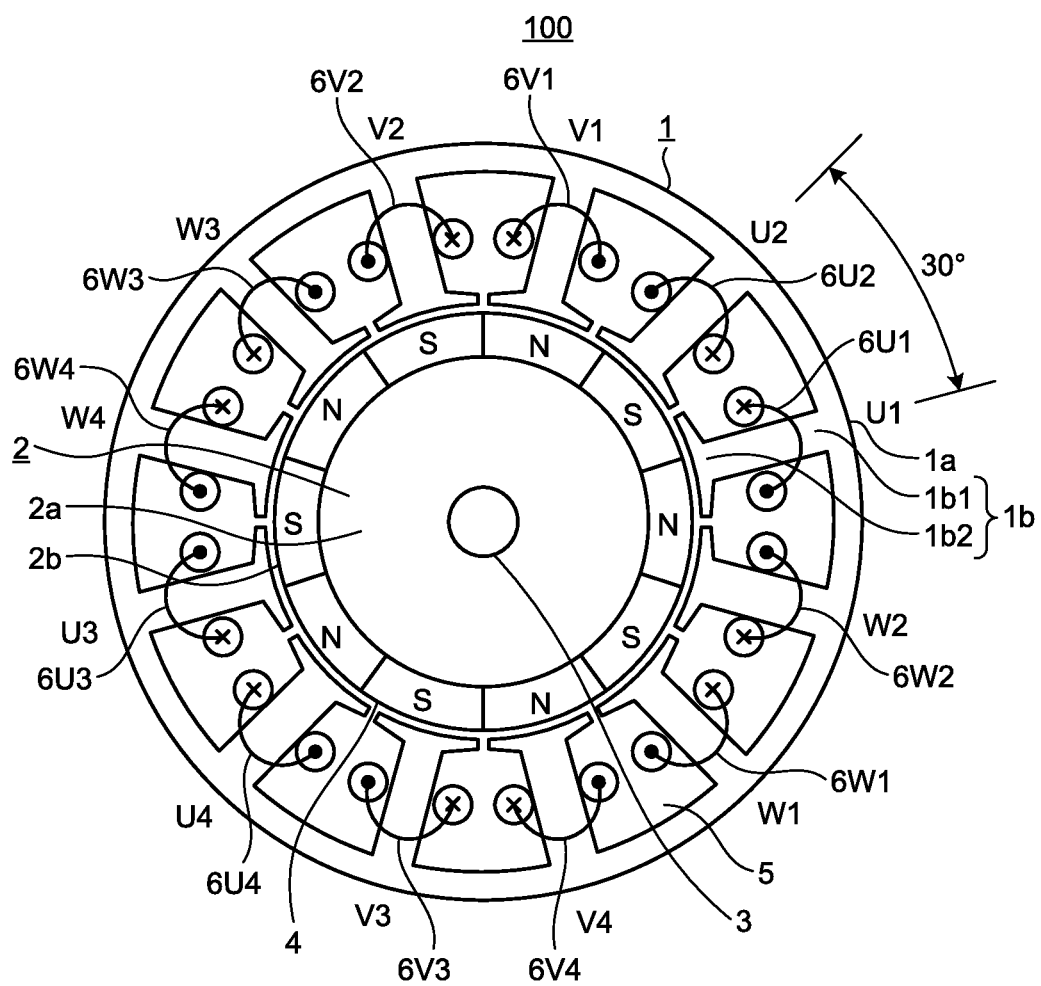
FIG. 1 is a transverse cross-sectional view of a permanent magnet synchronous motor according to a first embodiment of the present invention.
Figure 2:
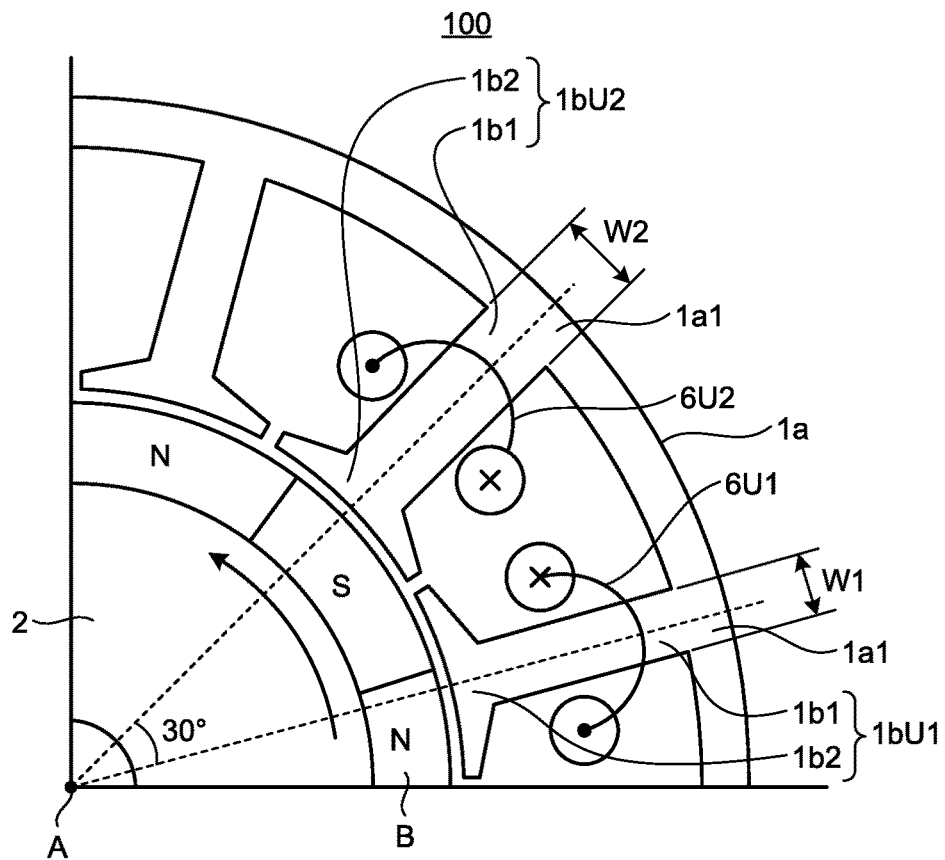
FIG. 2 is a fragmentary enlarged view of major parts of the permanent magnet synchronous motor illustrated in FIG. 1.

FIG. 1 is a transverse cross-sectional view of a permanent magnet synchronous motor according to a first embodiment of the present invention, and FIG. 2 is a fragmentary enlarged view of major parts of the permanent magnet synchronous motor illustrated in FIG. 1. The permanent magnet synchronous motor 100 comprises a stator 1 and a rotor 2 placed radially inward of the stator 1 with a gap 4 in between.

The rotor 2 comprises an annular rotor core 2a formed of magnetic steel sheets laid one over another to be fixed on a shaft 3 and ten permanent magnets 2b arranged on the outer edge of the rotor core 2a. The ten permanent magnets 2b are arranged alternately in a rotational direction such that adjacent permanent magnets 2b differ in polarity so as to form five pole pairs of N and S poles. The "rotational direction" refers to the direction in which the rotor 2 rotates. Each of the permanent magnets 2b is a rare-earth magnet or ferrite magnet.

Although the rotor 2 illustrated in the drawings is a surface permanent magnet (SPM) type of rotor in which permanent magnets 2b are arranged on the outer edge of the rotor core 2a, it may be a rotor, other than the SPM type, such as an interior permanent magnet (IPM) type of rotor in which permanent magnets 2b are embedded in the rotor core 2a. In the case of an IPM-type rotor, permanent magnets are fixed in a rotor core: by inserting, through pressing in, the permanent magnets into magnet inserting holes formed in the rotor core; or by coating an adhesive. Further, not being limited to the one having magnetic steel sheets laid one over another, the rotor core 2a may be an integral core obtained by machining steel material, a resin core obtained by solidifying a mixture of resin and iron powder, or a dust core obtained by pressure forming magnetic powder, the type of core to be used varying according to the purpose and application.

The stator 1 is formed of an annular yoke 1a, a plurality of teeth 1b arranged radially inward of the yoke 1a at equal intervals in the rotational direction and extending toward the center of the yoke 1a, and coils 6 (6U1, 6U2, 6U3, 6U4, 6V1, 6V2, 6V3, 6V4, 6W1, 6W2, 6W3, 6W4) wound around the teeth 1b respectively. The yoke 1a and the teeth 1b forming part of the stator 1 are formed by stacking a plurality of core pieces punched out of magnetic steel sheet base material.

Each of the teeth 1b consists of a winding portion 1b1 extending from the inner circumferential surface of the yoke 1a toward the center of the stator 1 and around which a coil 6 is to be wound in concentrated winding and a brim-shaped or umbrella-shaped end 1b2 formed radially inward of the winding portion 1b1 to protrude in both rotational directions of the stator 1 with respect to the winding portion 1b1. The width of the winding portion 1b1 along a direction orthogonal to a radial direction of the stator 1 is uniform. That is, the winding portion 1b1 has a width uniform when going from the outer side toward the inner side along a radial direction of the stator 1. The end 1b2 has a shape symmetrical with respect to the rotational direction. As such, with the end 1b2 being in a brim or umbrella shape, the synchronous motor is structured such that the magnetic forces of the permanent magnets 2b of the rotor 2 are effectively interlinked with the teeth 1b, so that torque can be improved.

In the stator 1, a slot 5 is formed at a part surrounded by two adjacent teeth 1b, so that 12 slots 5 are provided. Thus, according to the permanent magnet synchronous motor 100, the relationship between the number of magnetic poles and the number of slots is 10 poles and 12 slots. Further, in the permanent magnet synchronous motor 100, coils 6 forming three phases are wound in concentrated winding around the 12 teeth 1b. Of these coils 6, four coils 6 forming one phase from among a U phase, a V phase, and a W phase are divided into two sets, and two coils 6 forming each of the sets are wound around the winding portions of two adjacent teeth 1b respectively.

Specifically, four coils 6 forming the U phase are divided into two sets, and two coils 6U1 and 6U2 forming one of the sets are wound around the winding portions 1b1 of two adjacent teeth 1b respectively, and two coils 6U3 and 6U4 forming the other set are wound around the winding portions 1b1 of two adjacent teeth 1b respectively. The winding direction of the coil 6U2 is opposite to that of the coil 6U1, and the winding direction of the coil 6U4 is opposite to that of the coil 6U3.

Four coils 6 forming the V phase are divided into two sets, and two coils 6V1 and 6V2 forming one of the sets are wound around the winding portions 1b1 of two adjacent teeth 1b respectively, and two coils 6V3 and 6V4 forming the other set are wound around the winding portions 1b1 of two adjacent teeth 1b respectively. The winding direction of the coil 6V2 is opposite to that of the coil 6V1, and the winding direction of the coil 6V4 is opposite to that of the coil 6V3.

Four coils 6 forming the W phase are divided into two sets, and two coils 6W1 and 6W2 forming one of the sets are wound around the winding portions 1b1 of two adjacent teeth 1b respectively, and two coils 6W3 and 6W4 forming the other set are wound around the winding portions 1b1 of two adjacent teeth 1b respectively. The winding direction of the coil 6W2 is opposite to that of the coil 6W1, and the winding direction of the coil 6W4 is opposite to that of the coil 6W3.

FIG. 2 illustrates the coils 6U1 and 6U2 that are one set of coils 6 from among four coils 6 forming the U phase. In FIG. 2, supposing that the rotor 2 rotates counterclockwise, from among two adjacent teeth which the coils 6U1, 6U2 are wound around, the first tooth 1b placed in front along the rotational direction of the rotor 2 is referred to as a tooth 1bU1, and the second tooth 1b placed behind along the rotational direction of the rotor 2 is referred to as a tooth 1bU2. Since being arranged at equal intervals in the rotational direction as described previously, the plurality of teeth 1b are placed at intervals of mechanical angle 30° with the center axis A of the stator 1 as the center as illustrated in FIG. 2.

In the permanent magnet synchronous motor 100 configured in this way, when the rotor 2 rotates, a phase difference occurs between the inductive voltage generated in the coil 6U1 wound around the tooth 1bU1 and the inductive voltage generated in the coil 6U2 wound around the tooth 1bU2. In the stator 1 according to the present embodiment, focusing on this phase difference, the teeth are formed in such a way that the rotational direction width W1 of the winding portion 1b1 of the tooth 1bU1 is narrower than the rotational direction width W2 of the winding portion 1b1 of the tooth 1bU2. The respective rotational direction widths of the winding portions 1b1 of two adjacent teeth 1b which the coils 6U3 and 6U4 illustrated in FIG. 1 are wound around also have the same relationship. Further, the respective rotational direction widths of the winding portions 1b1 of two adjacent teeth 1b which the coils 6V1 and 6V2 are wound around also have the same relationship; the respective rotational direction widths of the winding portions 1b1 of two adjacent teeth 1b which the coils 6V3 and 6V4 are wound around also have the same relationship; the respective rotational direction widths of the winding portions 1b1 of two adjacent teeth 1b which the coils 6W1 and 6W2 are wound around also have the same relationship; and the respective rotational direction widths of the winding portions 1b1 of two adjacent teeth 1b which the coils 6W3 and 6W4 are wound around also have the same relationship.

The reason why the respective rotational direction widths of the winding portions 1b1 of two adjacent teeth 1b forming the same phase are different will be described below.

First, the phase difference between the combined inductive voltage for one phase and the inductive voltage generated in each coil of one set of coils forming the one phase will be described. The teeth 1b are placed at intervals of mechanical angle 30° with the center axis A of the stator 1 as the center as illustrated in FIG. 2. The mechanical angle 30° is equal to the value 360° divided by 12. Thus, when the rotor 2, of which the number of magnetic poles is ten, rotates, if coils 6 are respectively wound around two adjacent teeth 1b in the same direction, a phase difference of a 150° electrical angle occurs between inductive voltages generated in the individual coils 6. The electrical angle of 150° is equal to the value mechanical angle 30° multiplied by five, the number of pole pairs.

When the rotor 2 rotates, from among the plurality of magnetic poles, the phase of the inductive voltage generated in the coil 6U2 due to a permanent magnet 2b indicated by a reference symbol B in FIG. 2 passing by the tooth 1bU2 is delayed by an electrical angle of 150° relative to the phase of the inductive voltage generated in the coil 6U1 due to that permanent magnet passing by the tooth 1bU1.

In contrast, when the winding direction of one of the coils 6U1 and 6U2 is opposite to that of the other, the inductive voltage is inverted in the positive-negative sign. Thus, the phase of the inductive voltage generated in the coil 6U1 due to the permanent magnet 2b indicated by the reference symbol B passing by the tooth 1bU1 is delayed by an electrical angle of 30° relative to the phase of the inductive voltage generated in the coil 6U2 due to that permanent magnet passing by the tooth 1bU2. That is, the phase difference between the inductive voltages is a −30° electrical angle. This value −30° is equal to the value obtained by adding −180° to 150°.

As such, in the 10-pole 12-slot permanent magnet synchronous motor, because the phase difference between the respective inductive voltages generated in a set of coils 6 forming the same phase takes on a close value, these are dealt with as windings of the same phase.

Figure 3:
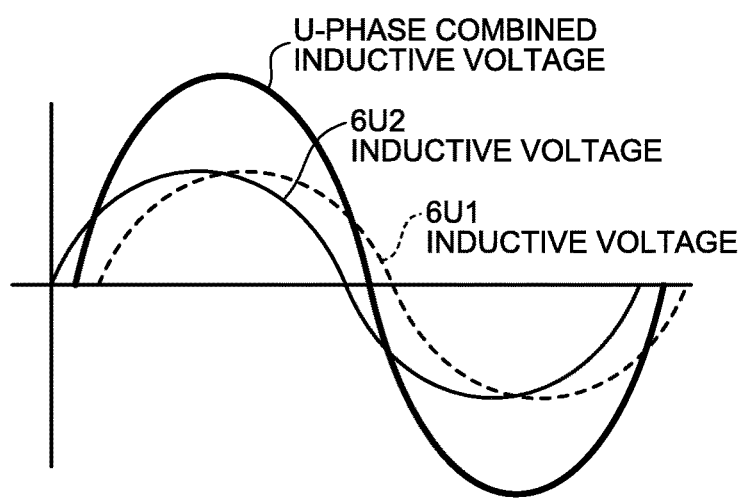
FIG. 3 is a graph illustrating the waveforms of respective inductive voltages generated in a set of coils forming a U phase and the waveform of a combined inductive voltage of these inductive voltages.

FIG. 3 is a graph illustrating the waveforms of the respective inductive voltages generated in a set of coils forming the U phase and the waveform of a combined inductive voltage of these inductive voltages. In order to generate torque in the permanent magnet synchronous motor, a sinusoidal current synchronous with the inductive voltage generated in each phase needs to be flowed through the coils of the corresponding phase. The generated torque varies with the phase of the inductive voltage for one phase and the phase of the phase current flowing through the coils. In the case of the permanent magnet synchronous motor having a surface-arranged rotor in which permanent magnets are arranged on the surface of the rotor, the largest torque can be generated with the same current when the phase of the inductive voltage coincides with the phase of the phase current flowing through the coils.

The value of the U-phase combined inductive voltage illustrated in FIG. 3 is equal to the combined value of the inductive voltage generated in the coil 6U1 wound around the tooth 1bU1 and the inductive voltage generated in the coil 6U2 wound around the tooth 1bU2 illustrated in FIG. 2. It is assumed that the phase of the U-phase combined inductive voltage coincides with the phase of the phase current flowing through the coils 6U1 and 6U2. The phase of the inductive voltage generated in the coil 6U1 is delayed by an electrical angle of 15° relative to the U-phase combined inductive voltage, and the phase of the inductive voltage generated in the coil 6U2 is advanced by an electrical angle of 15° relative to the U-phase combined inductive voltage.

Next, the relationship between the phase of the inductive voltage, the phase of the phase current flowing through the coils, and the iron loss occurring in the stator iron core will be described.

The iron loss occurring in the stator iron core tends toward increasing as the magnetic flux density in the stator iron core becomes higher. When currents flow through the coils of the stator to generate output torque in the permanent magnet synchronous motor, because the magnetic flux generated from the coils is added to the magnetic flux generated from the permanent magnets, the magnetic flux density in the stator iron core increases, resulting in an increase in the iron loss. At this time, if the phase current is delayed in phase relative to the inductive voltage, the magnetic flux generated from the coils acts to increase the magnetic flux density in the iron core, and if the phase current is advanced in phase relative to the inductive voltage, the magnetic flux generated from the coils acts to decrease the magnetic flux density in the iron core. Hence, if the phase current is delayed in phase relative to the inductive voltage, the iron loss tends toward increasing, and if the phase current is advanced in phase relative to the inductive voltage, the iron loss tends toward decreasing. As such, in the stator iron core of the 10-pole 12-slot permanent magnet synchronous motor, because the phase advancement and delay of the phase current occur simultaneously, the iron loss occurring in the first tooth 1bU1 from among two adjacent teeth forming the U phase is smaller than the iron loss occurring in the second tooth 1bU2 when the rotor 2 rotates as illustrated in FIG. 2. That is, the respective iron losses occurring in two adjacent teeth forming the same phase are not even.

The inventor of the present application, focused on this difference between the respective iron losses occurring in two adjacent teeth forming the same phase. The inventor of the present application came to invent the permanent magnet synchronous motor 100 that can improve motor efficiency by setting the rotational direction width W1 of the winding portion 1b1 of the first tooth 1bU1 to be narrower than the rotational direction width W2 of the winding portion 1b1 of the second tooth 1bU2 from among two adjacent teeth forming the same phase as illustrated in FIG. 2, thereby shortening the circumferential length of the coil 6 wound around the winding portion 1b1 of the first tooth 1bU1 to relatively reduce the copper loss of the coil.

Figure 4:
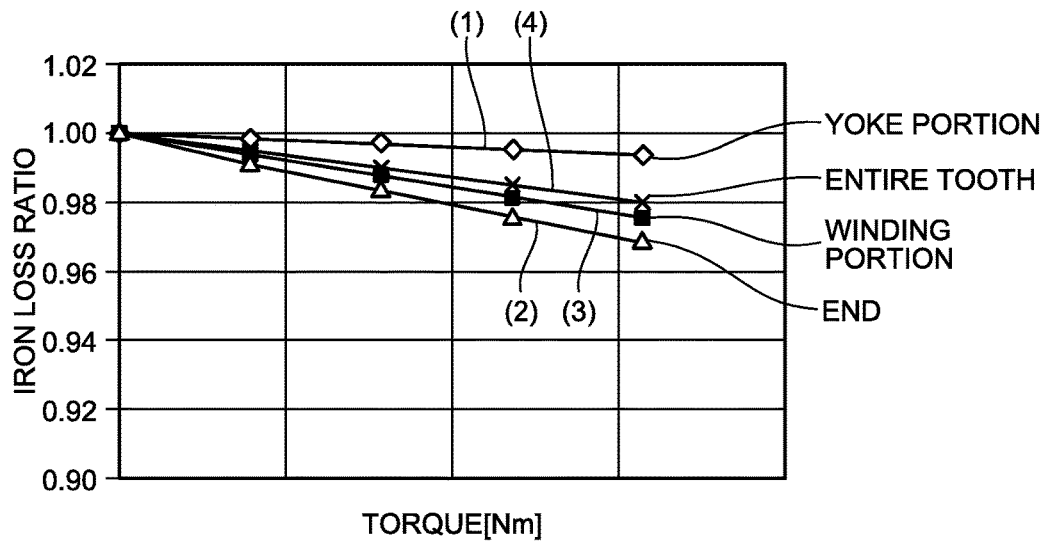
FIG. 4 is a graph illustrating the results of iron losses occurring at portions of a tooth, the results are obtained through electromagnetic field analysis and comparison.

FIG. 4 is a graph illustrating the result of comparison of the iron losses occurring at parts of the tooth obtained through electromagnetic field analysis. The horizontal axis represents output torque generated in the motor, and the vertical axis represents an iron loss ratio. The iron loss ratio is the proportion of the iron loss of the first tooth placed in front along the rotational direction of the rotor to that of the second tooth placed behind along the rotational direction of the rotor from among adjacent teeth forming the same phase. Let the first tooth be the tooth 1bU1 illustrated in FIG. 2 and the second tooth be the tooth 1bU2 for simplicity of description. The iron loss ratio indicated by (1) is the proportion of the iron loss at a yoke part 1a1, part of the entire yoke 1a where the tooth 1bU1 is provided, to the iron loss at a yoke part 1a1, part where the tooth 1bU2 is provided. The iron loss ratio indicated by (2) is the proportion of the iron loss at the end 1b2 of the tooth 1bU1 to the iron loss at the end 1$b$2 of the tooth 1$b$U2. The iron loss ratio indicated by (3) is the proportion of the iron loss at the winding portion 1$b$1 of the tooth 1$b$U1 to the iron loss at the winding portion 1$b$1 of the tooth 1$b$U2. The iron loss ratio indicated by (4) is the average of the iron loss ratios (1) to (3), that is, the proportion of the iron loss in the entire tooth 1$b$U1 to the iron loss in the entire tooth 1$b$U2. At the time of rotation without load, that is, when no current is conducted through the coils, there is no difference in iron loss, but when a current is conducted through the coils, each of the iron loss ratios (1) to (4) tends toward decreasing as the output torque increases as illustrated in FIG. 4.

The magnetic flux density in the iron core increases as the cross-section area of the flux path in the iron core decreases, and thus the iron loss also increases. In general, the iron loss occurring in the iron core material is said to increase in proportion to the magnetic flux density to the power of 1.6 in the case of hysteresis loss. Hence, if each of the radial direction width of the yoke part 1$a$1, the rotational direction width of the winding portion 1$b$1, and the radial direction width of the end 1$b$2 is decreased by the same size to make the flux path narrower, part of the iron core where the degree of increase in the magnetic flux density is the lowest is the winding portion 1$b$1 from among the yoke part 1$a$1, the winding portion 1$b$1, and the end 1$b$2. In the permanent magnet synchronous motor of the first embodiment, paying attention to the winding portion 1$b$1, where the degree of increase in the magnetic flux density is the lowest, the rotational direction width W1 of the winding portion 1$b$1 of the first tooth 1$b$U1 is set narrower than the rotational direction width W2 of the winding portion 1$b$1 of the second tooth 1$b$U2 as illustrated in FIG. 2. By this means, the circumferential length of the coil 6U1 wound around the winding portion 1$b$1 of the first tooth 1$b$U1 can be made shorter than that of the coil 6U2 wound around the winding portion 1$b$1 of the second tooth 1$b$U2 with suppressing increase in the iron loss.

In the conventional technique described in Patent Literature 1 cited previously, although teeth in different shapes are alternately arranged, the synchronous motor is of a toroidal-coil type, wherein the circumferential lengths of its coils cannot be reduced, and thus it differs from the present invention in configuration and effect. Further, Patent Literature 1 does not describe a relationship between the shapes of the teeth and the iron loss. In the conventional technique described in Patent Literature 2, a phase difference does not occur between the respective inductive voltages generated in the windings forming the same phase, and thus the same effect as in the present invention cannot be obtained. In the conventional technique described in Patent Literature 3, it is not that teeth in different shapes are arranged paying attention to the phase difference between the inductive voltage and conducted current, and thus the same effect as in the present invention cannot be obtained.

As described above, the 10-pole 12-slot permanent magnet synchronous motor according to the present embodiment comprises a stator core including an annular yoke and a plurality of teeth arranged inward of the yoke apart in a circumferential direction of the yoke, and a rotor placed inward of the stator core. Each of the plurality of teeth has a portion around which a coil is wound. The plurality of teeth make up six teeth groups. Each of the six teeth groups includes first and second teeth arranged in a rotational direction of the rotor and around which coils of the same phase are wound. The portion of the first tooth is formed to be narrower in width than the portion of the second tooth. With this configuration, the circumferential length of the coil wound around the first tooth can be shortened with suppressing increase in the iron loss in the winding portion of the first tooth. As a result, the circumferential length of the coil wound around the winding portion becomes shorter, so that the copper loss is reduced correspondingly to the shortening of the circumferential length of the coil, and thus motor efficiency can be improved. Further, the amount of coil usage is suppressed, so that production cost can be reduced.

Second Embodiment

Figure 5:
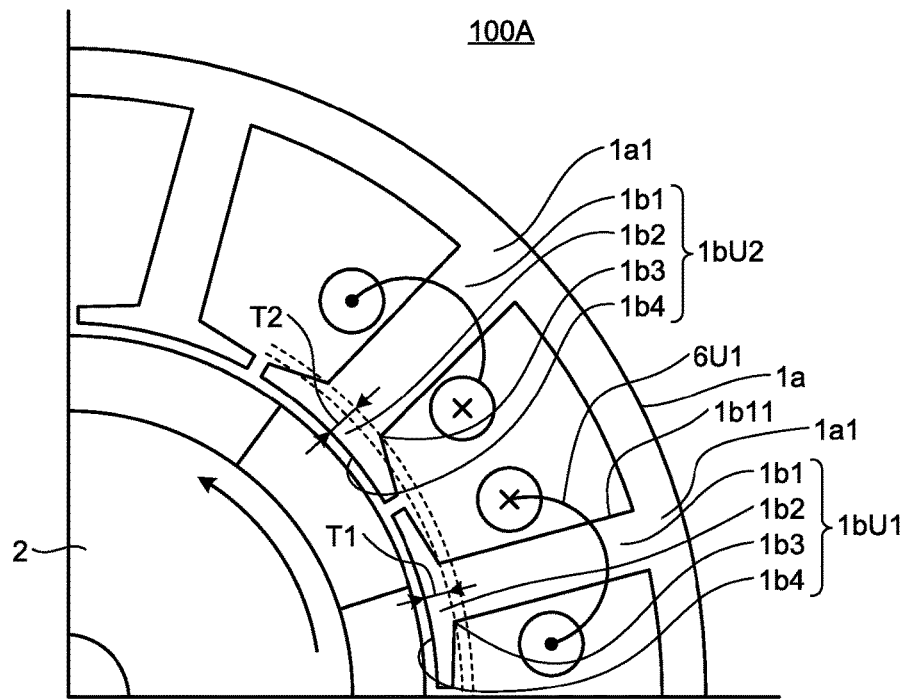
FIG. 5 is a fragmentary enlarged view of major parts of a permanent magnet synchronous motor according to a second embodiment of the present invention.

FIG. 5 is a fragmentary enlarged view of major parts of a permanent magnet synchronous motor according to a second embodiment of the present invention. In the second embodiment, the same reference numerals are used to denote the same parts as in the first embodiment with description thereof being omitted, and only different parts will be described. In the permanent magnet synchronous motor 100A according to the second embodiment, the radial direction thickness T1 of the end 1$b$2 of the first tooth 1$b$U1 is set thinner than the radial direction thickness T2 of the end 1$b$2 of the second tooth 1$b$U2. The thickness T1 is equal to the radial direction width measured from a root 1$b$3 between the winding portion 1$b$1 and the end 1$b$2 of the first tooth 1$b$U1 to its rotor facing surface 1$b$4. The thickness T2 is equal to the radial direction width measured from a root 1$b$3 between the winding portion 1$b$1 and the end 1$b$2 of the second tooth 1$b$U2 to its rotor facing surface 1$b$4.

Figure 6:
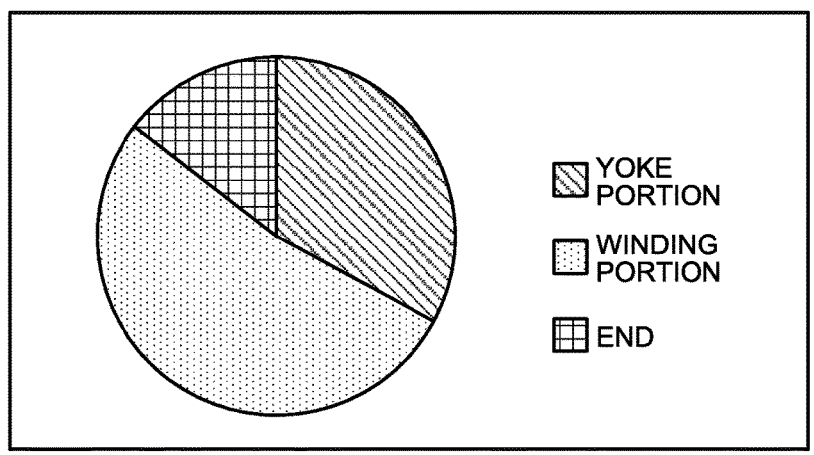
FIG. 6 is a graph illustrating proportions of iron losses occurring at parts of a tooth relative to an iron loss occurring in the entire tooth.

FIG. 6 is a graph illustrating proportions of iron losses occurring at parts of a tooth relative to the iron loss occurring in the entire tooth. Iron losses respectively occurring at the yoke part 1$a$1, the winding portion 1$b$1, and the end 1$b$2 forming a tooth increase in the order of the end 1$b$2, the yoke part 1$a$1, and the winding portion 1$b$1 as illustrated in FIG. 6, with the iron loss occurring at the end 1$b$2 being the smallest. Further, as illustrated in FIG. 4, when output torque increases, the iron loss ratio of the end 1$b$2 indicated by (2) is lower than the iron loss ratio of the winding portion 1$b$1 indicated by (3). Thus, increase in the iron loss occurring in the entire tooth when the radial direction thickness T1 of the end 1$b$2 of the first tooth 1$b$U1 illustrated in FIG. 5 is set smaller, can be suppressed to a lower degree than increase in the iron loss occurring in the entire tooth when the circumferential direction width of the winding portion 1$b$2 is set smaller. By setting the radial direction thickness T1 of the end 1$b$2 of the first tooth 1$b$U1 to be smaller, the radial direction length of the winding portion 1$b$1 becomes relatively longer, so that the cross-section area of the slot can be enlarged. Further, since the radial direction length of the winding portion 1$b$1 of the first tooth 1$b$U1 becomes longer, the cross-section area of a rotational direction facing side surface 1$b$11 of the winding portion 1$b$1 increases. Thus, part of an entire coil 6U1 wound around the winding portion 1$b$1 of the first tooth 1$b$U1 that touches the side surface 1$b$11 facing in the rotational direction increases, so that the circumferential length of the coil can be further shortened as compared with the first embodiment, and thus the copper loss is reduced correspondingly to the shortening of the circumferential length of the coil. As a result, motor efficiency can be further improved with suppressing the influence of increase in the iron loss to a low level. Further, the amount of coil usage is further suppressed, so that production cost can be further reduced.

The configuration shown in the above embodiments is illustrative of the content of the present invention, and it is possible to combine it with other publicly known techniques, and also part of the configuration can be omitted or changed without departing from the spirit of the present invention.

The invention claimed is:

1. A 10N-pole 12N-slot stator core comprising:
   an annular yoke and a plurality of teeth arranged inward of the yoke apart in a circumferential direction of the annular yoke,
   wherein each of the plurality of teeth has a portion around which a coil is to be wound,
   wherein each of a 6N number of teeth groups includes a first tooth and a second tooth of the teeth group sequentially arranged in a rotation direction of a rotor and around which coils of same phase are to be wound so as to form 10N poles and 12N slots, and
   wherein a width of the portion of the first tooth is narrower than a width of the portion of the second tooth and N is an integer of one or greater.

2. The 10N-pole 12N-slot stator core according to claim 1, wherein a radial direction width of an end of the first tooth is narrower than a radial direction width of an end of the second tooth.

3. The 10N-pole 12N-slot stator core according to claim 1, wherein a winding direction of the coil wound around the first tooth is opposite to a winding direction of the coil wound around the second tooth.

4. A permanent magnet synchronous motor comprising The 10N-pole 12N-slot stator core according to claim 1 and a rotor placed inward of The 10N-pole 12N-slot stator core.

5. An air-conditioning apparatus comprising the permanent magnet synchronous motor according to claim 4.

* * * * *